United States Patent
McKee

[15] 3,647,269
[45] Mar. 7, 1972

[54] STABLE BEARING CAGE
[72] Inventor: Lewis W. McKee, Brookfield, Conn.
[73] Assignee: The Barden Corporation, Danbury, Conn.
[22] Filed: May 15, 1970
[21] Appl. No.: 37,767

[52] U.S. Cl. ...........................................................308/201
[51] Int. Cl. ......................................................F16c 33/38
[58] Field of Search .........................................308/201, 217

[56] References Cited

UNITED STATES PATENTS 2,838,348  6/1958  Hamm...................................308/201

FOREIGN PATENTS OR APPLICATIONS 10,296      1913    Great Britain.........................308/201
216,758    6/1924  Great Britain.........................308/201
340,433    5/1904  Great Britain.........................308/201
1,024,497  1/1953  France...................................308/201

Primary Examiner—Edgar W. Geoghegan
Assistant Examiner—Frank Susko
Attorney—Shenier and O'Connor

[57] ABSTRACT

A stable cage for the balls of a ball bearing in which the annular body of the cage having radially extending cylindrical ball pockets therein is provided with spaced annular grooves in its inner or outer surface which grooves run through the pockets at locations along which the bearing balls normally would contact the edge of the pocket cage. The construction simulates square ball pockets thus to reduce the tendency of the cage to vibrate and to operate in an unstable mode.

12 Claims, 6 Drawing Figures

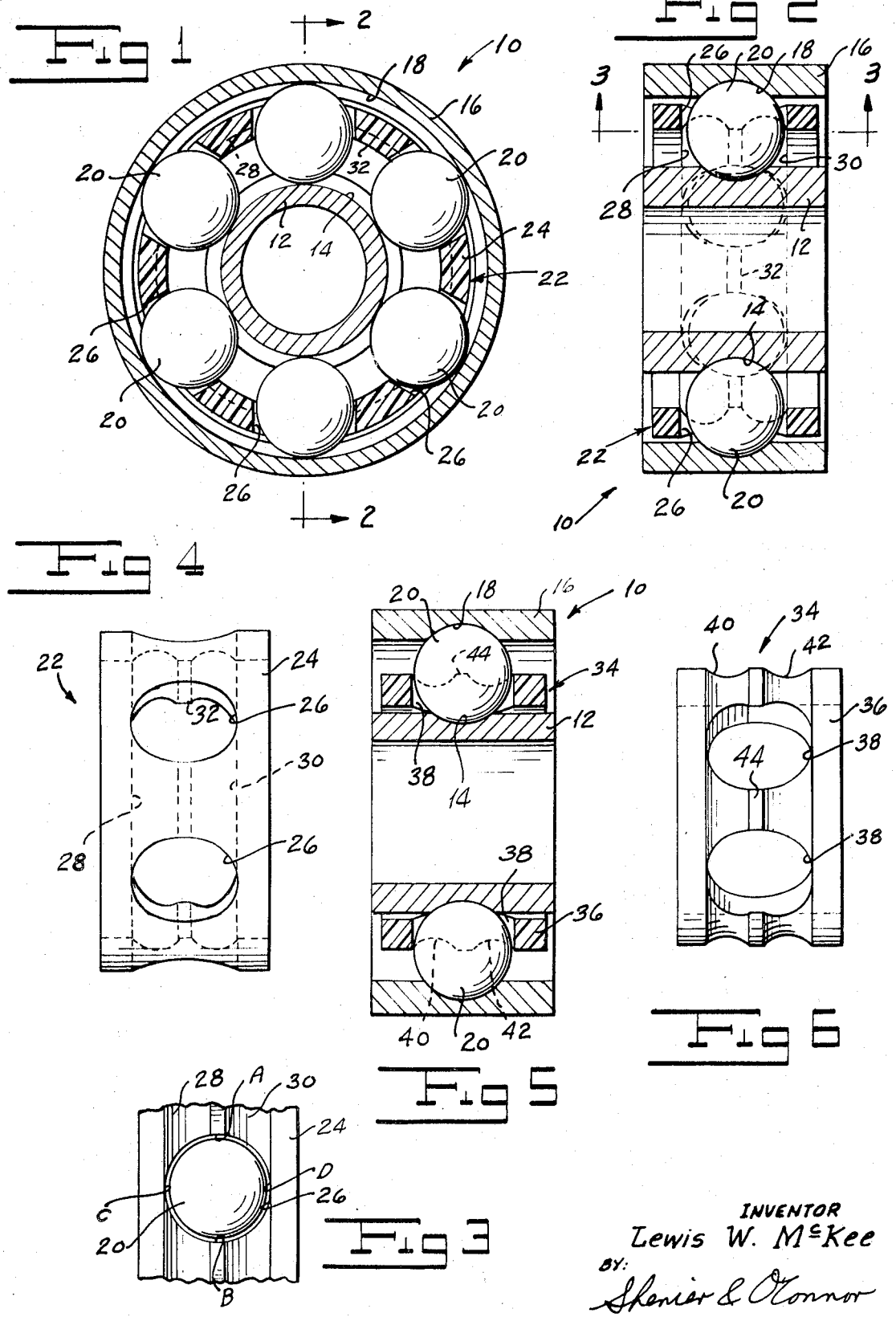

STABLE BEARING CAGE

BACKGROUND OF THE INVENTION

Most ball bearings employ ball cages located in the space between the inner and outer rings of the bearing for holding the balls in spaced relationship between the inner and outer rings. One of the most common types of bearing cage known in the prior art comprises an annular body having generally radially extending cylindrical ball pockets the walls of which are contacted by the bearing balls when the bearing is driven so that the cage is driven by the balls.

It will be appreciated that the bearing cages of which is slightly greater than the diameter of the balls so that the cage is a relatively freely movable body within the space between the inner and outer rings. One of the defects of cages of this type is their tendency to vibrate or to operate in an unstable manner when the cage is driven by the balls. While the precise cause of this tendency is not known, I have discovered that the tendency to vibrate is minimized if the retainer can be provided with square pockets so as to reduce the line of contact of the balls with the cage. It will be appreciated, however, that the operation of forming square ball pockets in an annular body is a difficult, time consuming and consequently expensive operation. I have invented a stable bearing cage which overcomes the tendency of cages of the prior art to vibrate or to operate in an unstable mode. My cage is relatively simple for the result achieved thereby. It does not require difficult and time consuming machining operations. It is relatively inexpensive to manufacture for the result achieved thereby.

SUMMARY OF THE INVENTION

One object of my invention is to provide a bearing cage which overcomes the defect of bearing cages of the prior art.

Another object of my invention is to provide a bearing cage which operates in a stable manner.

A further object of my invention is to provide a stable bearing cage which is relatively simple in construction.

Still another object of my invention is to provide a stable bearing cage which does not require difficult and time-consuming machining operations in the course of its manufacture.

Yet another object of my invention is to provide a stable bearing cage which is inexpensive to manufacture.

Other and further objects of my invention will appear from the following description.

In general my invention contemplates the provision of a cage for the balls of a ball bearing in which an annular body provided with spaced radially extending generally cylindrical ball pockets is formed with grooves extending into the surface of the body and spaced from a plane perpendicular to the axis of the body and bisecting the body so as to produce the effect of square ball pockets.

BRIEF DESCRIPTION

In the accompanying drawings which form part of the instant specification and which are to be read in conjunction therewith and in which like reference numerals are used to indicate like parts in the various views:

FIG. 1 is a sectional view of a ball bearing which is provided with one form of my stable ball cage.

FIG. 2 is a sectional view of the bearing shown in FIG. 1 taken along the line 2—2 of FIG. 1.

FIG. 3 is a fragmentary view of part of the cage and a ball shown in FIG. 2 and taken along the line 3—3 of FIG. 2.

FIG. 4 is an elevation of the form of my stable bearing cage illustrated in FIGS. 1 to 3.

FIG. 5 is a sectional view of a ball bearing provided with an alternate form of my stable bearing cage.

FIG. 6 is an elevation of the form of my stable bearing cage illustrated in FIG. 5.

DESCRIPTION OF THE PREFERRED EMBODIMENT

Referring now to FIGS. 1 to 4, a bearing indicated generally by the reference character 10 with which my My stable bearing retainer indicated generally by the reference character 22 is made up of an annular body 24 of any suitable material such for example as a porous lubricant-retaining sintered nylon or the like. Body 24 is provided with a plurality of radially extending ball pockets 26 for receiving the balls 20 and for holding the balls in spaced relationship around the bearing.

In operation of the bearing 10 and retainer 22 thus far described, when the inner ring 12 for example is driven balls 20 also rotate around their axis along the outer ring raceway 18. When that occurs, the balls make contact generally at the equators of the balls so as to drive the cage 24 in the same direction as that in which the inner ring 12 is driven. In the prior art the edges of the ball pockets adjacent the equators of the balls are circular so that contact between the balls and the cage 24 usually is line contact. I have discovered that this operation results in a tendency of the cage to vibrate or to operate in an unstable manner. I have further discovered that the tendency can be minimized if not eliminated by making the pockets of the cage square. While that expedient would provide an effective remedy it entails such difficult and time consuming machining operations as to render it an impractical solution.

In my improved stable cage 24 I form respective annular grooves 28 and 30 running around the inside surface of the body 24 and extending radially outwardly from that surface. The width of the two grooves is such that they extend from the outer edges of the pockets to locations adjacent a plane perpendicular to the axis of and bisecting the body 24. Thus, there is provided an area 32 of the inner surface of the body 24 between the two grooves 28 and 30. Owing to this construction a ball 20 can only make contact with the body 24 at points indicated by reference characters A, B, C and D in FIG. 3. That is, no matter how the cage moves with relation to the balls it cannot engage the balls over any appreciable line of contact. Stated otherwise, the provision of the two grooves 28 and 30 results in the effect of square ball pockets in the regions whereat the ball can contact the retainer. That is, each of the locations A, B, C and D whereat the ball 20 can contact body 24 lies on a side of a virtual square.

For the structure thus far described and from the drawings it will be apparent that I so construct cage 22 as to be under the control of the outer ring 16 since its outer surface is relatively close to the outer ring 16 while its inner surface is relatively remote from the outer surface of the inner ring 12.

In some instances it is desirable that the cage be controlled by the inner ring 12 rather than the outer ring 16. In such an installation I employ the form of my cage shown in FIGS. 5 and 6 and indicated generally by the reference character 34. Cage 34 includes an annular body 36 which may be formed from the same material as that of which body 24 is made or from any other appropriate the balls 20. In this form of my invention, however, rather than providing radially outwardly extending annular grooves I form radially inwardly extending annular grooves 40 and 42 in the outer surface of body 36. As was the case with the grooves 28 and 30 grooves 40 and 42 have outer edges which run substantially tangentially of the ball pockets 38 and have inner edges spaced by a portion 44 of the outer surface of body 36.

In manufacturing the form of my cage 22 illustrate in FIGS. 1 to 4 body 24 first is molded or otherwise formed in any appropriate manner known to the art. Next, the ball pockets 26 are provided by drilling them through the body 24. Finally, the internal grooves 28 and 30 are formed in the inner surface on a lathe or the like. The form of my cage indicated by the reference character 34 is formed in a similar manner. As is pointed out hereinabove, I have discovered that a cage such as cage 22 or cage 34 has little or no tendency to vibrate or to operate in an unstable manner.

It will be seen that I have accomplished the objects of my invention. I have provided a ball bearing cage which overcomes the defect of cages of the prior art. My cage operates in a stable manner. It is relatively simple to manufacture and is consequently inexpensive for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing cage for receiving a ball for rotation on a center on the locus of a circle comprising, an annular body having inner and outer surfaces, said body including said locus, a radially extending ball pocket formed in said body, said pocket having a generally cylindrical wall, and respective recesses formed in said body adjacent to and leading into said pocket through said wall, said recesses extending radially inwardly from one of said surfaces through a projection of said locus appreciably to reduce the line of contact between the ball and the pocket wall.

2. A bearing cage as in claim 1 in which said recesses are located on opposite sides of a plane normal to the axis of the bisecting said body.

3. A bearing cage as in claim 1 in which said recesses extend radially inwardly from the outer surface of said body.

4. A bearing cage as in claim 1 in which said recesses extend radially outwardly from the inner surface of said body.

5. A bearing cage for receiving a plurality of balls for rotation on centers on the locus of a circle comprising, an annular body having inner and outer surfaces, said body including said locus, a plurality of circumferentially spaced, radially extending ball pockets formed in said body, said pockets having generally cylindrical walls, and respective annular grooves formed in said body, said grooves extending through said walls into said pockets, each of said grooves extending radially inwardly from one of said surfaces through a projection of said locus appreciably to reduce the line of contact between said balls and said pocket walls.

6. A bearing cage as in claim 5 in which said grooves are located at each side of a plane perpendicular to the axis of and bisecting said body.

7. A bearing cage as in claim 5 in which said grooves extend radially inwardly from the outer surface of said body.

8. A bearing cage as in claim 5 in which said grooves extend radially outwardly from the inner surface of said body.

9. A bearing cage as in claim 5 in which the outer edges of the respective grooves are generally tangent to the ball pockets adjacent the outer edges of the body.

10. A bearing cage as in claim 5 in which the outer edges of the respective grooves are generally tangent to said ball pockets adjacent the outer edges of said body and in which the inner edges of said grooves are adjacent to a plane perpendicular to the axis of and bisecting said body.

11. A bearing assembly including in combination an inner ring having a raceway therein, an outer ring having a raceway therein, balls disposed between said rings in said raceways, and a cage comprising an annular body having inner and outer surfaces, said body including said locus, a plurality of circumferentially spaced, radially extending ball pockets formed in said body, said pockets having generally cylindrical walls, and respective annular grooves formed in said body, said grooves extending through said walls into said pockets, each of said grooves extending radially inwardly from one of said surfaces through a projection of said locus appreciably to reduce the line of contact between said balls and said pocket walls.

12. A bearing assembly as in claim 11 in which the outer edges of said grooves are generally tangent to said ball pockets adjacent the outer edges of said body and in which the inner edges of said grooves are located on opposite sides of a plane perpendicular to and bisecting said body to provide pairs of diametrically opposite spaced regions of contact between each of said balls and said body. cage, to be described hereinafter, may be used, includes an inner ring 12 formed with a raceway 14 and an outer ring 16 formed with a raceway 18. Balls 20 are disposed in raceways 14 and 18 between the two rings 12 and 16.

* * * * *

PO-1050
(5/69)

UNITED STATES PATENT OFFICE
CERTIFICATE OF CORRECTION

Patent No. 3,647,269                     Dated    March 7, 1972

Inventor(s)    Lewis W. McKee

It is certified that error appears in the above-identified patent and that said Letters Patent are hereby corrected as shown below:

Column 4, lines 33 through 37, after "body." delete

-- cage, to be described hereinafter, may be used, includes an inner ring 12 formed with a raceway 14 and an outer ring 16 formed with a raceway 18. Balls 20 are disposed in raceways 14 and 18 between the two rings 12 and 16. --

Signed and sealed this 4th day of July 1972.

(SEAL)
Attest:

EDWARD M. FLETCHER, JR.                          ROBERT GOTTSCHALK
Attesting Officer                                    Commissioner of Patents